(12) United States Patent
Hsiang et al.

(10) Patent No.: US 9,593,207 B2
(45) Date of Patent: Mar. 14, 2017

(54) POLYAMIC ACID, POLYIMIDE, AND METHOD FOR MANUFACTURING GRAPHITE SHEET

(71) Applicant: INDUSTRIAL TECHNOLOGY RESEARCH INSTITUTE, Hsinchu (TW)

(72) Inventors: Shou-Jui Hsiang, Taoyuan (TW); Si-Yi Chin, Hsinchu (TW); Wei-Ta Yang, Jhongli (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 491 days.

(21) Appl. No.: 14/172,532

(22) Filed: Feb. 4, 2014

(65) Prior Publication Data
US 2015/0130098 A1 May 14, 2015

(30) Foreign Application Priority Data

Nov. 13, 2013 (TW) .............................. 102141200 A (51) Int. Cl.
*C08G 69/32* (2006.01)
*C08G 73/10* (2006.01)
(Continued)

(52) U.S. Cl.
CPC .......... *C08G 73/1067* (2013.01); *C01B 31/04* (2013.01); *C08G 73/105* (2013.01);
(Continued)

(58) Field of Classification Search
CPC ............ C08G 73/1042; C08G 73/1082; C09D 179/08; B29K 2079/08
See application file for complete search history.

(56) References Cited

U.S. PATENT DOCUMENTS 3,955,256 A * 5/1976 Park ......................... B64C 1/40
139/420 R
5,019,642 A 5/1991 Hashimoto
(Continued)

FOREIGN PATENT DOCUMENTS

CN 1826288 A 8/2006
CN 101641323 A 2/2010
(Continued)

OTHER PUBLICATIONS

Japanese Notice of Allowance, dated Aug. 18, 2015, for Japanese Application No. 2014-104459.
(Continued)

Primary Examiner — Gregory Listvoyb
(74) Attorney, Agent, or Firm — Birch, Stewart, Kolasch & Birch, LLP

(57) ABSTRACT

Disclosed is a method of fabricating a graphite sheet, including: polymerizing diamines and a dianhydride to form a polyamic acid. The polyamic acid is solvent casted on a substrate and hot baked to form a polyamic acid film or gel film. The polyamic acid film or gel film is biaxially stretched at a high temperature imidization or chemical imidization to form the polyimide film. The polyimide film is then carbonized and graphitized to form a graphite sheet. The diamines include a diamine of Formula 1 and a diamine of Formula 2, and the dianhydride includes a dianhydride of Formulae 3, Formula 4, Formula 5, Formula 6, Formula 7, Formula 8, Formula 9, or combinations thereof.

(Formula 1)

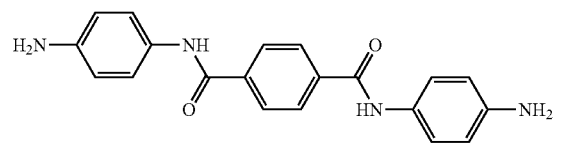

(Formula 2)

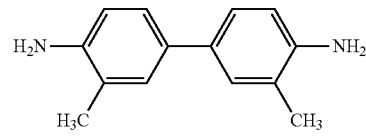

(Formula 3)

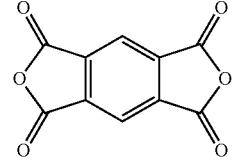

(Formula 4)

(Formula 5)

(Formula 6)

(Continued)

-continued

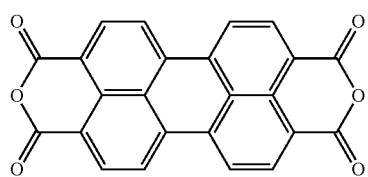
(Formula 7)

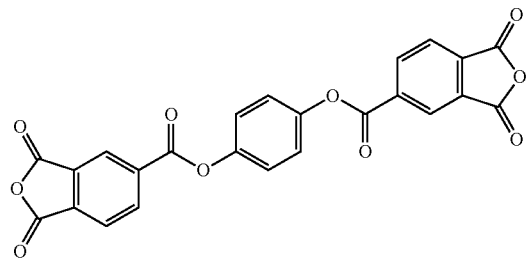

(Formula 8)

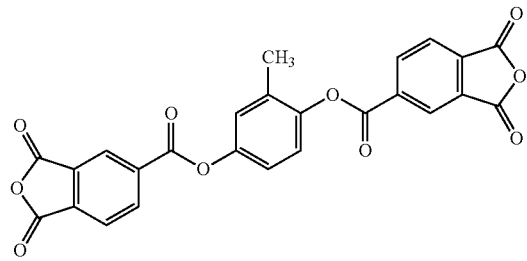

(Formula 9)

16 Claims, 2 Drawing Sheets (51) Int. Cl.
C01B 31/04 (2006.01)
C09D 179/08 (2006.01)
C08G 73/14 (2006.01)
C08G 73/16 (2006.01)
B29K 79/00 (2006.01)

(52) U.S. Cl.
CPC ..... C08G 73/1042 (2013.01); C08G 73/1071 (2013.01); C08G 73/1082 (2013.01); C08G 73/14 (2013.01); C08G 73/16 (2013.01); C09D 179/08 (2013.01); B29K 2079/08 (2013.01)

(56) References Cited

U.S. PATENT DOCUMENTS

| | | | |
|---|---|---|---|
| 5,178,804 A * | 1/1993 | Watanabe | B29C 43/003 264/29.7 |
| 6,511,701 B1 | 1/2003 | Divigalpitiya et al. | |
| 7,758,842 B2 | 7/2010 | Nishikawa et al. | |
| 8,105,565 B2 | 1/2012 | Nishikawa et al. | |
| 8,221,883 B2 | 7/2012 | Shimoyama et al. | |
| 8,309,645 B2 | 11/2012 | Swei et al. | |
| 8,337,800 B2 | 12/2012 | Nishikawa et al. | |
| 2008/0220282 A1 | 9/2008 | Jang et al. | |
| 2010/0196716 A1 | 8/2010 | Ohta et al. | |
| 2011/0045300 A1 | 2/2011 | Tamaoki et al. | |
| 2012/0077020 A1* | 3/2012 | Muramatsu | B82Y 30/00 428/319.1 |
| 2012/0171451 A1 | 7/2012 | Nishikawa et al. | |
| 2013/0141916 A1 | 6/2013 | Kobayashi et al. | |
| 2014/0066571 A1 | 3/2014 | Takasawa et al. | |

FOREIGN PATENT DOCUMENTS

| | | |
|---|---|---|
| JP | 2002-265760 A | 9/2002 |
| JP | 2004-269319 A | 9/2004 |
| JP | 2005-119887 A | 5/2005 |
| JP | 2007-31236 A | 2/2007 |
| JP | 2007-204299 A | 8/2007 |
| JP | 2007-204301 A | 8/2007 |
| JP | 2008-24571 A | 2/2008 |
| JP | 2008-69061 A | 3/2008 |
| JP | 2008-80672 A | 4/2008 |
| JP | 2008-222958 A | 9/2008 |
| JP | 2008-272976 A | 11/2008 |
| JP | 2008-285362 A | 11/2008 |
| JP | 2009-107904 A | 5/2009 |
| JP | 2009-132602 A | 6/2009 |
| JP | 2009-203127 A | 9/2009 |
| JP | 2009-280433 A | 12/2009 |
| JP | 2009-292694 A | 12/2009 |
| JP | 2010-1191 A | 1/2010 |
| JP | 2010-13340 A | 1/2010 |
| JP | 2010-42959 A | 2/2010 |
| JP | 2010-64906 A | 3/2010 |
| JP | 2010-64929 A | 3/2010 |
| JP | 2010-64949 A | 3/2010 |
| JP | 2010-120818 A | 6/2010 |
| JP | 2010-132557 A | 6/2010 |
| JP | 2010-168281 A | 8/2010 |
| JP | 2010-189244 A | 9/2010 |
| JP | 2010-189267 A | 9/2010 |
| JP | 2010-195609 A | 9/2010 |
| JP | 2011-74287 A | 4/2011 |
| JP | 2011-105531 A | 6/2011 |
| JP | 2011-148702 A | 8/2011 |
| JP | 2011-219314 A | 11/2011 |
| JP | 2011-241142 A | 12/2011 |
| JP | 2012-46368 A | 3/2012 |
| JP | 2012-72036 A | 4/2012 |
| JP | 2012-76278 A | 4/2012 |
| JP | 2012-87047 A | 5/2012 |
| JP | 2012-97150 A | 5/2012 |
| JP | 2012-107127 A | 6/2012 |
| JP | 2012-136427 A | 7/2012 |
| JP | 2013-126950 A | 6/2013 |
| JP | 5273035 B2 | 8/2013 |
| KR | 10-2009-01239898 A | 12/2009 |
| KR | 10-2010-0034744 A | 4/2010 |
| TW | 562709 | 11/2003 |
| TW | 201300440 A | 1/2013 |
| WO | WO 2006/057183 A1 | 6/2006 |
| WO | WO 2008/117759 A1 | 10/2008 |
| WO | WO 2011/111843 A1 | 9/2011 |

OTHER PUBLICATIONS

Korean Office Action, dated Aug. 5, 2015, for Korean Application No. 10-2014-0034942, with an English translation.
E. M. Wewerka et al., "The Use of Organometallic Additives to Promote Graphitization of Carbons Derived From Furfuryl Alcohol Resins", Carbon, vol. 11, No. 4B, pp. 289-297, 1973.
G.S. Chung et al., "Properties of carbon nanofibers prepared from electrospun polyimide", Journal of Applied Polymer Science, vol. 97, pp. 165-170, 2005.
Isao Mochida et al., "Catalysts in Syntheses of Carbon and Carbon Precursors", J. Braz. Chem. Soc., vol. 17, No. 6, pp. 1059-1073, 2006.
Xianbiao Wang et al., "The graphite phase derived from polyimide at low temperature", Journal of Non-Crystalline Solids, vol. 355, pp. 72-75, 2009.
Yanling Luo et al., "Graphite Carbon Foam Films Prepared From Porous Polyimide With In Situ Formed Catalytic Nickel Particles", Journal of Applied Polymer Science, vol. 116, pp. 2110-2118 (2010).

(56) References Cited

OTHER PUBLICATIONS

Yuezhen Bin et al., "Catalytic effect of nickel under carbonization of polyimide films", Carbon, vol. 43, pp. 1617-1627, 2005.
Yutaka Kaburagi et al., "Galvanomagnetic Effect of Graphite Mixed with Iron and Heat-treated at High Temperatures", TANSO, No. 191, pp. 15-19, 2000.
Japan Office Action for Appl. No. 2014-104459 dated Mar. 10, 2015 (w/ English translation).
Chinese Office Action and Search Report, dated May 30, 2016, for Chinese Application No. 201310672060.3.
Japan Office Action dated Jun. 23, 2015 for Appl. No. 2014-104459 (w/ English translation).
Taiwan Office Action for Appl. No. 102141200 dated Aug. 19, 2014.
Korean Notice of Allowance and English translation dated Feb. 2, 2016 for corresponding Application No. 10-2014-0034942.

* cited by examiner

POLYAMIC ACID, POLYIMIDE, AND METHOD FOR MANUFACTURING GRAPHITE SHEET

CROSS REFERENCE TO RELATED APPLICATIONS

The present application is based on, and claims priority from, Taiwan Application Serial Number 102141200, filed on Nov. 13, 2013, the disclosure of which is hereby incorporated by reference herein in its entirety

TECHNICAL FIELD

The technical field relates to a polyimide, and in particular to a method of manufacturing a graphite sheet from the polyimide.

BACKGROUND

Artificial graphite sheets have an excellent thermal conductivity of 1600 W/m·k, which is largely better than the thermal conductivity of natural graphite sheets (only 200 to 300 W/m·k), 2 to 4 times the thermal conductivity of copper, and 3 to 6 times the thermal conductivity of aluminum. The artificial graphite sheets have an electrical conductivity of at least 10000 S/cm, which is about 3 to 5 times the electrical conductivity of the natural graphite sheets. The artificial graphite sheets have a weight which is 25% lighter than aluminum and 75% lighter than copper. In addition, the artificial graphite sheets have flexibility and an EMI shielding effect. While the requirement of 3C electronic products with a high operation speed and a thinner shape increases, the artificial graphite sheets are the preferred candidate among high thermally conductive materials for 3C electronic products. The conventionally artificial graphite sheets should be formed by a graphitization temperature of at least 2800° C. to have an excellent graphite structure. Moreover, it is difficult to obtain an excellent graphite structure with a thickness of at least 20 μm.

Accordingly, a novel method for manufacturing artificial graphite sheets is called-for.

SUMMARY

One embodiment of the disclosure provides a polyamic acid, being formed by a polymerization of diamines and a dianhydride, wherein the diamines include a diamine of Formula 1 and a diamine of Formula 2, and the dianhydride includes a dianhydride of Formula 3, Formula 4, Formula 5, Formula 6, Formula 7, Formula 8, Formula 9, or combinations thereof:

(Formula 1)

(Formula 2)

(Formula 3)

(Formula 4)

(Formula 5)

(Formula 6)

(Formula 7)

(Formula 8)

(Formula 9)

One embodiment of the disclosure provides a polyimide, being formed by a dehydration of the described polyamic acid.

One embodiment of the disclosure provides a method of preparing a graphite sheet, comprising: performing a polymerization of diamines and a dianhydride to form a polyamic acid; coating the polyamic acid on a substrate, and baking the coating to form a gel film; biaxially stretching, thermally or chemically cyclizing and dehydrating the gel film to form a polyimide film; and carbonizing and graphitizing the polyimide film to form a graphite sheet, wherein the diamines include a diamine of Formula 1 and a diamine of Formula 2, and the dianhydride includes a dianhydride of Formula 3, Formula 4, Formula 5, Formula 6, Formula 7, Formula 8, Formula 9, or combinations thereof:

(Formula 1)

(Formula 2)

(Formula 3)

(Formula 4)

(Formula 5)

(Formula 6)

(Formula 7)

(Formula 8)

(Formula 9)

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a method of manufacturing a graphite sheet, including polymerizing diamines and a dianhydride to form a polyamic acid. For example, the diamines include a diamine of Formula 1 and a diamine of Formula 2.

(Formula 1)

(Formula 2)

In one embodiment, the dianhydride includes a dianhydride of Formula 3, Formula 4, Formula 5, Formula 6, Formula 7, Formula 8, Formula 9, or combinations thereof.

(Formula 3)

(Formula 4)

(Formula 5)

(Formula 6)

(Formula 7)

(Formula 8)

(Formula 9)

In this embodiment, the polyamic acid is polymerized of 1 part by mole of the dianhydride, a parts by mole of the diamine of Formula 1, and b parts by mole of the diamine of Formula 2. a+b=1, and $0.11 \leq a:b \leq 9.0$. When a ratio of the diamine of Formula 1 increases, the coefficient of thermal expansion of a polyimide film (formed by thermal cyclization of the polyamic acid) will correspondingly increase. The polymerization of polyamic acid is easily gelled while a:b>9. When the ratio of the diamine of Formula 1 decreases, the coefficient of thermal expansion of the polyimide film (formed by thermal cyclization of the polyamic acid) will correspondingly decrease. The polyimide film is brittle and easily broken during film formation process while a:b<0.11.

Alternatively, the diamines not only include the diamines of Formulae 1 and 2, but also other diamines of Formula 10, Formula 11, Formula 12, Formula 13, Formula 14, Formula 15, Formula 16, Formula 17, Formula 18, Formula 19, Formula 20, Formula 21, or combinations thereof.

(Formula 10)

(Formula 11)

(Formula 12)

(Formula 13)

(Formula 14)

-continued (Formula 15)

(Formula 16)

(Formula 17)

(Formula 18)

(Formula 19)

(Formula 20)

(Formula 21)

In this embodiment, the polyamic acid is polymerized of 1 part by mole of the dianhydride, a parts by mole of the diamine of Formula 1, b parts by mole of the diamine of Formula 2, and c parts by mole of the diamine of Formula 10, Formula 11, Formula 12, Formula 13, Formula 14, Formula 15, Formula 16, Formula 17, Formula 18, Formula 19, Formula 20, Formula 21, or combinations thereof.

a+b+c=1, 0.11≤a:b≤9.0, and 0.1:0.9≤(a+b):c≤1:0. An overly high ratio of the diamine of Formula 10, Formula 11, Formula 12, Formula 13, Formula 14, Formula 15, Formula 16, Formula 17, Formula 18, Formula 19, Formula 20, Formula 21, or combinations thereof may enhance thermal expansion and reduce the mechanical strength of a polyimide film formed by heating the polyamic acid.

In one embodiment, a metal complex can be further added to the polymerization of the polyamic acid. The dianhydride and the metal complex have a molar ratio of 1:0.001 to 1:0.2, and the metal complex includes a metal complex of Formula 22. In Formula 22, each of $R^1$ and $R^2$, being the same or different, is $CH_3$ or $CF_3$. n is an integer of 2 to 4, and M is Zr, Ni, TiO, Fe, Co, Mn, Mg, Cu, Al, Cr, Ba, Pr, Pd, Sc, Na, Zn, V, Y, Pt, or Tl. The metal complex of Formula 22 may chelate with nitrogen atoms of the described diamines to form metal modified diamines, thereby further lowering a graphitization temperature of the polyimide film formed from the polyamic acid. An overly low amount of the metal complex cannot efficiently lower the graphitization temperature of the polyimide. An overly high amount of the metal complex may form too many foams or voids during a graphitization process, thereby forming a discontinuous graphite structure.

(Formula 22)

For example, the diamine of Formula 1, the diamine of Formula 2, and the dianhydride of Formula 3 are polymerized as shown in Formula 23. It should be understood that Formula 23 is merely for illustration. The diamine may further include the other diamine of Formula 10, Formula 11, Formula 12, Formula 13, Formula 14, Formula 15, Formula 16, Formula 17, Formula 18, Formula 19, Formula 20, Formula 21, or combinations thereof. The dianhydride can be a dianhydride of Formula 3, Formula 4, Formula 5, Formula 6, Formula 7, Formula 8, Formula 9, or combinations thereof. The polymerization is performed in a solvent such as 1,3-dimethyl-2-imidazolidinone (DMI), dimethyl formamide (DMF), N-methyl-2-pyrrolidone (NMP), N,N-dimethylacetamide (DMAc), γ-butyrolactone (GBL), another common organic polar solvent, or combinations thereof.

(Formula 23)

Subsequently, the polyamic acid solution is coated on a substrate, and then baked to form a gel film. The gel film is then biaxially stretched, thermally cyclized, or chemically cyclized to form a polyimide film. The coating step can be spin coating, dip coating, slit coating, spray coating, or other coating methods. The solvent of the polyamic acid film can be removed by heating the polyamic acid film. In one embodiment, the heating step for removing the solvent is performed at a temperature of 80° C. to 110° C. for a period of 10 minutes to 40 minutes. In addition, the heating step can be collocated with a vacuum process for decreasing the heating temperature and/or shortening the heating period. Thereafter, the polyamic acid film is dehydrated to form the polyimide film by thermal cyclization or chemical cyclization. The product in Formula 23 (the polyamic acid) is dehydrated to form the polyimide, as shown in Formula 24.

(Formula 24)

In one embodiment, the dehydration for forming the polyimide is heated at a temperature of 200° C. to 350° C. for a period of 1 hour to 3 hours. In addition, the dehydration may collocate with far infrared heating to reduce the heating period. The polyimide film with a thickness of 25 μm to 125 μm is obtained by the above processes. An overly thick polyimide film cannot form a graphite sheet with high and uniform graphitization degree through following carbonization and graphitization. An overly thin polyamic acid film will be easily broken during the carbonization or the graphitization. In the manufacture of the graphite sheet of the disclosure, the polyamic acid film with or without the metal complex includes but is not limited to a single-layered structure. For example, the film can be a multi-layered structure such as a multi-coating of a monolayer or a single-coating of multiple layers. In addition, the additive in the polyamic acid film is not limited to the metal complex. For example, thermally conductive particles such as alumina, silica, boron nitride, alumina wrapped by boron nitride, aluminum, silicon carbide, aluminum nitride, titanium oxide, calcium phosphide, barium titanate, nanotube or graphene can be added to the polyamic acid film.

The polyimide film is then carbonized and graphitized to form a graphite sheet. If a foaming degree of the graphitized product is high, an optional lamination or calendaring can be performed after the graphitization. In one embodiment, the precursor polyamic acid film includes the metal complex of Formula 22, and the polyimide forms graphite sheet at 1800° C. to 2800° C. Alternatively, the precursor polyamic acid is free of the metal complex of Formula 22, and the polyimide film forms graphite sheet at 2400° C. to 2800° C. The polyimide film formed from the polyamic acid has a thermal expansion coefficient of 5.0 ppm/° C., a stiffness of greater than 100 mg, and a thickness of less than or equal to 125 μm. In one embodiment, the polyimide film is graphitized at a temperature of greater than or equal to 1800° C. to form a graphite sheet with an electrical conductivity of greater than or equal to 500 S/cm. In one embodiment, the polyimide film is graphitized at a temperature of greater than or equal to 2200° C. to form a graphite sheet with an electrical conductivity of greater than or equal to 5000 S/cm. In one embodiment, the polyimide film is graphitized at a temperature of greater than or equal to 2400° C. to form a graphite sheet with a electrical conductivity of greater than or equal to 9000 S/cm. In one embodiment, the polyimide film is graphitized at a temperature of greater than or equal to 2600° C. to form a graphite sheet with a electrical conductivity of greater than or equal to 12000 S/cm.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The thermal expansion coefficient, thickness, stiffness, and spectrum of inductively coupled plasma optical emission spectroscopy (ICP-OES) of the polyimide films were measured. After graphitizing the polyimide films, the thickness, graphitization degree, electrical conductivity, and scanning electron microscopic (SEM) cross section viewing of the graphite sheets were measured. The methods of measurements were described below.

The thermal expansion coefficient of the polyimide films were measured by thermal dynamic analysis (Q400, commercially available from TA instruments). The size change of the polyimide films at a temperature range of 30° C. to 400° C. were measured, and the size change of the polyimide films at a temperature range of 50° C. to 200° C. were considered.

The thickness of samples such as the polyimide film or the graphite sheets were measured by a micrometer (No. 293561N) with routine corrections. The micrometer was re-zeroed, the sample was then fixed at a test location, and a value displayed on a monitor of the micrometer was the real thickness of the sample.

The stiffness of the polyimide films were measured as below. The polyimide film was cut to a strip of 10 mm×60 mm, which was then curved to a U-shape with a height of 1.5 cm. The U-shaped strip was fixed on a re-zero precision balance. The bending degree of the strip was related to a rigidity of the material thereof. The stiffness of the strip could be measured by the balance to calculate the rigidity of the polyimide.

The spectrum of ICP-OES of the polyimide films were measured by SPECTRO ARCOS to measure metal elements of the polyimide films containing the metal complex.

The graphitization degree of the graphite sheets were measured by CuKα X-rays with a wavelength of 0.154056 nm, a scanning angle of 24° to 29°, and a scanning speed of 0.02°/sec from a thin film X-ray diffractometer (Bede D1, commercially available from Bede Scientific Instrument Ltd.). $C_0$ of the below equation was substituted by d002 (nm) of the measured data to obtain the graphitization degree (g %), wherein $C_0$ is an interlayer spacing (nm) of hexagonal graphite. If $C_0$ was closer to 0.3354 nm, an ideal interlayer spacing of the hexagonal graphite, the graphitization degree would be higher.

$$g\ \% = \frac{(0.344 - C_0)}{(0.344 - 0.3354)} \times 100\%$$

The electrical conductivity of the graphite sheets were directly measured by four point probe tester (Laresta-EP MCP-T360), and the thermal conductivity of the graphite sheets were indirectly obtained.

The SEM cross section of the graphite sheets were obtained as described below. The graphite sheet was fixed on a copper paste, and an electrically conductive metal was plated thereon to complete a sample. The sample was put into a chamber of a field emission electron microscope (S-4200, commercially available from HITACHI), and the chamber was vacuumed to observe the microstructure of a cross section of the sample. If a sample had a higher graphitization degree, the layer-by-layer microstructure of its cross section would be denser and more obvious. On the other hand, if a sample had a lower graphitization degree, its cross section would be a block structure or a discontinuous structure, and its layer-by-layer microstructure would be sparser and less obvious.

Example 1-1

123 g of 1,3-dimethyl-2-imidazolidinone (DMI) was put into a reaction bottle. 0.3 mole (5.96 g) of the diamine of Formula 1 and 0.7 mole (8.53 g) of the diamine of Formula 2 were then added into the DMI to be completely stirred and dissolved. 1.0 mole (12.51 g) of the dianhydride of Formula 3 was added into the diamine solution at room temperature, and the reaction was stirred for 6 hours to obtain a polyamic acid solution with a solid content of 18 wt %. The polyamic acid solution was deaerated, and then evenly coated on a release film overlying a glass carrier by a blade having an appropriate thickness. The coating on the glass carrier was put into a hot air circulation oven to be baked at 80° C. for 30 minutes to remove most of the solvent for forming a gel film. The gel film was taken out from the release film to be put on a biaxial stretcher, and then put into a hot air circulation oven to be baked. The gel film was heated to 230° C. at a heating rate of 1.6° C./min and remained at 230° C. for a half hour to remove residual solvent, then heated to 350° C. at a heating rate of 1° C./min and remained at 350° C. for a half hour to dehydrate the polyamic acid for forming a polyimide, and then cooled to room temperature to obtain a polyimide film. The properties of the polyimide film are tabulated in Table 1.

The polyimide film was put in an interval between smooth graphite papers in a graphitization furnace. The chamber was purged by nitrogen and then vacuumed to remove any trace of moisture in the polyimide film. The chamber was then heated to 1000° C. at a heating rate of 16.7° C./min and remained at 1000° C. for a half hour for carbonizing the polyimide film. The chamber was then purged by 0.8 kg/cm² of argon, heated to a graphitization temperature of 2800° C. at a heating rate of 7° C./min and remained at 2800° C. for 1 hour to graphitize the carbonized film, and cooled to obtain a graphite sheet. The properties of the graphite sheet are tabulated in Table 1.

Example 1-2

Example 1-2 was similar to Example 1-1, with the difference in Example 1-2 being that the graphitization temperature was 2400° C. The properties of the graphite sheet are tabulated in Table 1.

Example 1-3

Example 1-3 was similar to Example 1-1, with the difference in Example 1-3 being that the graphitization temperature was 2200° C. The properties of the graphite sheet are tabulated in Table 1.

Example 1-4

Example 1-4 was similar to Example 1-1, with the difference in Example 1-4 being that the graphitization temperature was 1800° C. The properties of the graphite sheet are tabulated in Table 1.

As shown in Table 1, the graphite sheet having a higher graphitization degree and a higher electrical conductivity was formed by the higher graphitization temperature.

TABLE 1

| | | Examples | | | |
|---|---|---|---|---|---|
| | | 1-1 | 1-2 | 1-3 | 1-4 |
| Polyimide film | Thermal expansion coefficient (ppm/° C.) | 2.2 | | | |
| | Thickness (μm) | 25 | | | |
| | Stiffness (mg) | 173.5 | | | |
| Graphite sheet | Graphitization temperature (° C.) | 2800 | 2400 | 2200 | 1800 |

TABLE 1-continued

| | Examples | | | |
|---|---|---|---|---|
| | 1-1 | 1-2 | 1-3 | 1-4 |
| Graphitization degree (%) | 95.3 | 87.2 | 80.7 | 16.3 |
| Electrical conductivity (S/cm) | 15102 | 8170 | 4639 | 876 |
| Thickness (μm) | 10 | 11 | 11 | 16 |

Comparative Example 1-1

A commercially available polyimide film (Kanake NPI) was put in an interval between smooth graphite papers in a graphitization furnace. The chamber was purged by nitrogen and then vacuumed to remove any trace of moisture in the polyimide film. The chamber was then heated to 500° C. at a heating rate of 10° C./min and remained at 500° C. for a half hour, and then heated to 1200° C. at a heating rate of 6° C./min and remained at 1200° C. for a half hour for carbonizing the polyimide film. The chamber was then purged by 0.8 kg/cm² of argon, heated to a graphitization temperature of 2800° C. at a heating rate of 8° C./min and remained at 2800° C. for 2 hours to graphitize the carbonized film, and cooled to obtain a graphite sheet. The properties of the graphite sheet are tabulated in Table 2.

Comparative Example 1-2

Figure 3:
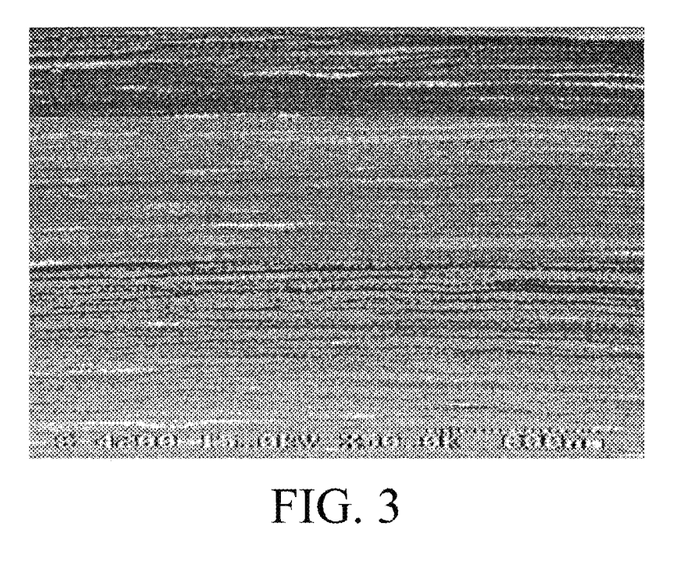
FIG. 3 shows an SEM cross section of a graphite sheet in one example of the disclosure.

Comparative Example 1-2 was similar to Comparative Example 1-1, with the difference in Comparative Example 1-2 being that the graphitization temperature was 2400° C. The properties of the graphite sheet are tabulated in Table 2, and the SEM (×50,000) of the graphite sheet is shown in FIG. 3. The cross section of the graphite sheet was transferred from a block structure to a layered microstructure. The layered microstructure was not very dense, and a locally discontinuous and block structure still occurred.

Comparative Example 1-3

Comparative Example 1-3 was similar to Comparative Example 1-1, with the difference in Comparative Example 1-3 being that the graphitization temperature was 2200° C. The properties of the graphite sheet are tabulated in Table 2.

Comparative Example 1-4

Figure 1:
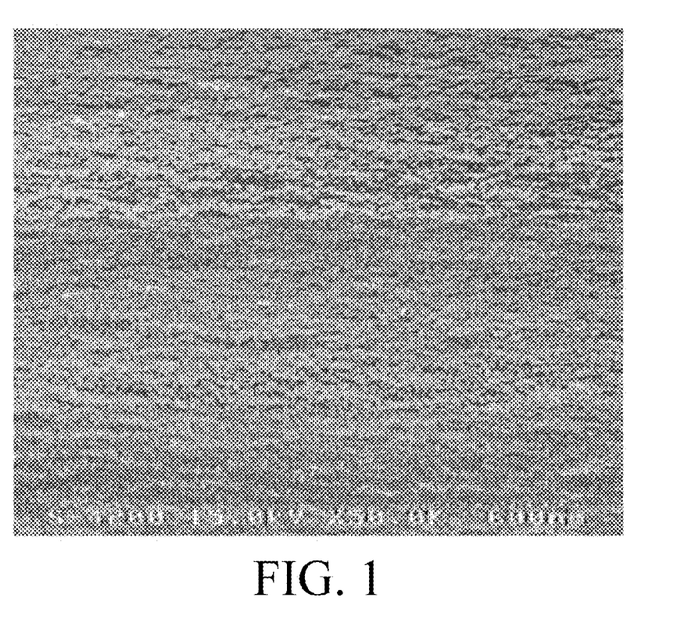
FIG. 1 shows an SEM cross section of a graphite sheet in one example of the disclosure.

Comparative Example 1-4 was similar to Comparative Example 1-1, with the difference in Comparative Example 1-4 being that the graphitization temperature was 1800° C. The properties of the graphite sheet are tabulated in Table 2, and the SEM (×50,000) of the graphite sheet is shown in FIG. 1. The cross section of the graphite sheet was a block and discontinuous structure.

As shown by a comparison between Tables 1 and 2, the polyimide film in Examples 1-1 to 1-4 had a lower coefficient of thermal expansion, a higher stiffness, and a higher uniformity of molecular arrangement than that of the commercially available polyimide film in Comparative Examples 1-1 to 1-4. The graphite sheets in Examples 1-1 to 1-4 had a higher graphitization degree and an electrical conductivity than that of the graphite sheets in Comparative Examples 1-1 to 1-4 at the same graphitization temperature. However, the electrical conductivity of the graphite sheets in Examples 1-1 to 1-4 were obviously decreased at a graphitization temperature lower than 2600° C.

TABLE 2

|  |  | Comparative Examples | | | |
|---|---|---|---|---|---|
|  |  | 1-1 | 1-2 | 1-3 | 1-4 |
| Polyimide film | Thermal expansion coefficient (ppm/° C.) |  |  | 17 |  |
|  | Thickness (μm) |  |  | 25 |  |
|  | Stiffness (mg) |  |  | 85.6 |  |
| Graphite sheet | Graphitization temperature (° C.) | 2800 | 2400 | 2200 | 1800 |
|  | Graphitization degree (%) | 94.2 | 86.8 | 80.1 | 14.7 |
|  | Electrical conductivity (S/cm) | 14039 | 7263 | 3207 | 549 |
|  | Thickness (μm) | 10 | 11 | 11 | 16 |

Comparative Example 1-1

123 g of 1,3-dimethyl-2-imidazoliodinone (DMI) was put into a reaction bottle. 1 mole (13.32 g) of the diamine of Formula 2 was then added into the DMI to be completely stirred and dissolved. 1.0 mole (13.68 g) of the dianhydride of Formula 3 was added into the diamine solution at room temperature, and the reaction was stirred for 6 hours to obtain a polyamic acid solution with a solid content of 18 wt %. The polyamic acid solution was deaerated, and then evenly coated on a release film overlying a glass carrier by a blade having an appropriate thickness. The coating on the glass carrier was put into a hot air circulation oven to be baked at 80° C. for 30 minutes to remove most of the solvent for forming a gel film. The gel film was taken out from the release film to be put on a biaxial stretcher, and then put into a hot air circulation oven to be baked. The gel film was heated to 230° C. at a heating rate of 1.6° C./min and remained at 230° C. for a half hour to remove residual solvent, then heated to 350° C. at a heating rate of 1° C./min and remained at 350° C. for a half hour to dehydrate the polyamic acid for forming a polyimide, which was broken to fail of forming a film.

Example 2-1

123 g of 1,3-dimethyl-2-imidazolidinone (DMI) was put into a reaction bottle, and 0.005 mole of zirconium complex (see Formula 22, wherein M was Zr, $R^1$ was $CH_3$, $R^2$ was $CF_3$, and n=4) was dissolved in the DMI. Subsequently, 0.3 mole (5.92 g) of the diamine of Formula 1 and 0.7 mole (8.46 g) of the diamine of Formula 2 were then added into the zirconium complex solution to be completely stirred and dissolved. 1.0 mole (12.42 g) of the dianhydride of Formula 3 was added into the diamine solution at room temperature, and the reaction was stirred for 6 hours to obtain a polyamic acid solution with a solid content of 18 wt %. The polyamic acid solution was deaerated, and then evenly coated on a release film overlying a glass carrier by a blade having an appropriate thickness. The coating on the glass carrier was put into a hot air circulation oven to be baked at 80° C. for 30 minutes to remove most of the solvent for forming a gel film. The gel film was taken out from the release film to be put on a biaxial stretcher, and then put into a hot air circulation oven to be baked. The gel film was heated to 230° C. at a heating rate of 1.6° C./min and remained at 230° C. for a half hour to remove residual solvent, then heated to 350° C. at a heating rate of 1° C./min and remained at 350° C. for a half hour to dehydrate the polyamic acid for forming a polyimide, and then cooled to room temperature to obtain a polyimide film. The properties of the polyimide film are tabulated in Table 3. The polyimide film was measured by the ICP-OES, and 0.070 wt % of Zr element was detected.

The polyimide film was put in an interval between smooth graphite papers in a graphitization furnace. The chamber was purged by nitrogen and then vacuumed to remove any trace of moisture in the polyimide film. The chamber was then heated to 500° C. at a heating rate of 10° C./min and remained at 500° C. for a half hour, and then heated to 1200° C. at a heating rate of 6° C./min and remained at 1200° C. for a half hour for carbonizing the polyimide film. The chamber was then purged by 0.8 kg/cm² of argon, heated to a graphitization temperature of 2800° C. at a heating rate of 8° C./min and remained at 2800° C. for 2 hours to graphitize the carbonized film, and cooled to obtain a graphite sheet. The properties of the graphite sheet are tabulated in Table 3.

Example 2-2

Example 2-2 was similar to Example 2-1, with the difference in Example 2-2 being that the zirconium complex was replaced to 0.005 mole (0.1 g) of a nickel complex (see Formula 22, wherein M was Ni, $R^1$ was $CH_3$, $R^2$ was $CF_3$, and n=4). The other processes for manufacturing the polyimide film and the graphitization were similar to those in Example 2-1. The properties of the graphite sheet are tabulated in Table 3.

Example 2-3

Example 2-3 was similar to Example 2-1, with the difference in Example 2-3 being that the zirconium complex was replaced to 0.005 mole (0.07 g) of a titanium complex (see Formula 22, wherein M was TiO, $R^1$ was $CH_3$, $R^2$ was $CH_3$, and n=2). The other processes for manufacturing the polyimide film and the graphitization were similar to those in Example 2-1. The properties of the graphite sheet are tabulated in Table 3.

Example 2-4

Example 2-4 was similar to Example 2-1, with the difference in Example 2-4 being that the zirconium complex was replaced to 0.005 mole (0.15 g) of a iron complex (see Formula 22, wherein M was Fe, $R^1$ was $CH_3$, $R^2$ was $CF_3$, and n=3). The other processes for manufacturing the polyimide film and the graphitization were similar to those in Example 2-1. The properties of the graphite sheet are tabulated in Table 3.

TABLE 3

|  |  | Examples | | | |
|---|---|---|---|---|---|
|  |  | 2-1 | 2-2 | 2-3 | 2-4 |
| Polyimide film | Metal complex | Zirconium complex | Nickel complex | Titanium complex | Iron complex |
|  | Thermal expansion coefficient (ppm/° C.) | 4.9 | 1.1 | 2.9 | −1.0 |
|  | Thickness (μm) |  | 25 | | |
|  | Stiffness (mg) | 286.7 | 317.7 | 268.5 | 292.5 |

TABLE 3-continued

|  |  | Examples | | | |
| --- | --- | --- | --- | --- | --- |
|  |  | 2-1 | 2-2 | 2-3 | 2-4 |
| Graphite sheet | Graphitization temperature (° C.) | 2800 | | | |
|  | Graphitization degree (%) | 97.42 | 97.89 | 96.42 | 96.87 |
|  | Electrical conductivity (S/cm) | 16800 | 16153 | 16537 | 16378 |
|  | Thickness (μm) | 10 | | | |

Example 3-1

Figure 4:
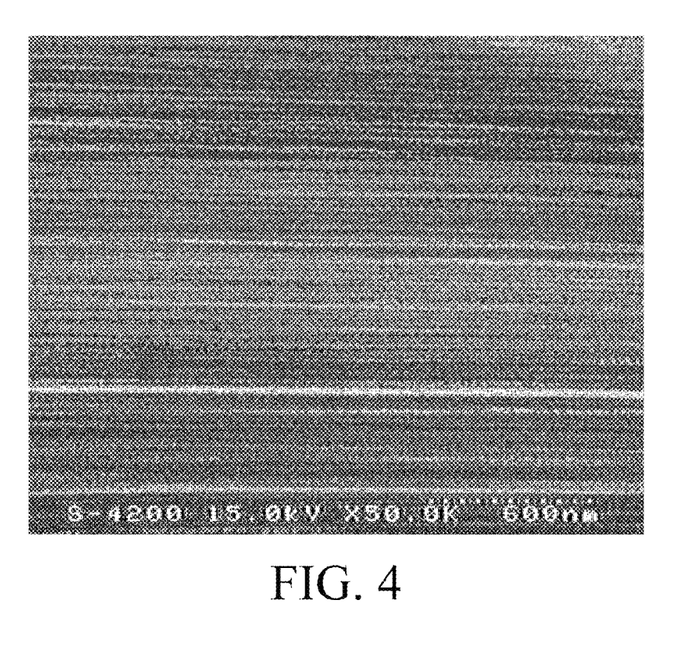
FIG. 4 shows an SEM cross section of a graphite sheet in one example of the disclosure.

Example 3-1 was similar to Example 2-1, with the difference in Example 3-1 being that the graphitization temperature was 2400° C. The properties of the graphite sheet are tabulated in Table 4, and the SEM (×50,000) of the graphite sheet is shown in FIG. 4. The cross section of the graphite sheet was more obvious than that in FIG. 3. As shown by a comparison between FIGS. 3 and 4, the metal complex indeed catalyzed the graphitization.

Example 3-2

Example 3-2 was similar to Example 3-1, with the difference in Example 3-2 being that the zirconium complex was replaced to 0.005 mole (0.1 g) of a nickel complex (see Formula 22, wherein M was Ni, $R^1$ was $CH_3$, $R^2$ was $CF_3$, and n=4). The other processes for manufacturing the polyimide film and the graphitization were similar to those in Example 3-1. The properties of the graphite sheet are tabulated in Table 4.

Example 3-3

Example 3-3 was similar to Example 3-1, with the difference in Example 3-3 being that the zirconium complex was replaced to 0.005 mole (0.07 g) of a titanium complex (see Formula 22, wherein M was TiO, $R^1$ was $CH_3$, $R^2$ was $CH_3$, and n=2). The other processes for manufacturing the polyimide film and the graphitization were similar to those in Example 3-1. The properties of the graphite sheet are tabulated in Table 4.

Example 3-4

Example 3-4 was similar to Example 3-1, with the difference in Example 3-4 being that the zirconium complex was replaced to 0.005 mole (0.15 g) of a iron complex (see Formula 22, wherein M was Fe, $R^1$ was $CH_3$, $R^2$ was $CF_3$, and n=3). The other processes for manufacturing the polyimide film and the graphitization were similar to those in Example 3-1. The properties of the graphite sheet are tabulated in Table 4.

TABLE 4

|  |  | Examples | | | |
| --- | --- | --- | --- | --- | --- |
|  |  | 3-1 | 3-2 | 3-3 | 2-4 |
| Polyimide film | Metal complex | Zirconium complex | Nickel complex | Titanium complex | Iron complex |
|  | Thermal expansion coefficient (ppm/° C.) | 4.9 | 1.1 | 2.9 | −1.0 |
|  | Thickness (μm) | 25 | | | |
|  | Stiffness (mg) | 282.6 | 315.2 | 263.4 | 289.7 |
| Graphite sheet | Graphitization temperature (° C.) | 2400 | | | |
|  | Graphitization degree (%) | 92.8 | 93.2 | 91.5 | 92.3 |
|  | Electrical conductivity (S/cm) | 9680 | 9272 | 9361 | 9267 |
|  | Thickness (μm) | 11 | | | |

Example 4-1

Example 4-1 was similar to Example 2-1, with the difference in Example 3-1 being that the graphitization temperature was 2200° C. The properties of the graphite sheet are tabulated in Table 5.

Example 4-2

Example 4-2 was similar to Example 4-1, with the difference in Example 4-2 being that the zirconium complex was replaced to 0.005 mole (0.1 g) of a nickel complex (see Formula 22, wherein M was Ni, $R^1$ was $CH_3$, $R^2$ was $CF_3$, and n=4). The other processes for manufacturing the polyimide film and the graphitization were similar to those in Example 4-1. The properties of the graphite sheet are tabulated in Table 5.

Example 4-3

Example 4-3 was similar to Example 4-1, with the difference in Example 4-3 being that the zirconium complex was replaced to 0.005 mole (0.07 g) of a titanium complex (see Formula 22, wherein M was TiO, $R^1$ was $CH_3$, $R^2$ was $CH_3$, and n=2). The other processes for manufacturing the polyimide film and the graphitization were similar to those in Example 4-1. The properties of the graphite sheet are tabulated in Table 5.

Example 4-4

Example 4-4 was similar to Example 4-1, with the difference in Example 4-4 being that the zirconium complex was replaced to 0.005 mole (0.15 g) of an iron complex (see Formula 22, wherein M was Fe, $R^1$ was $CH_3$, $R^2$ was $CF_3$, and n=3). The other processes for manufacturing the polyimide film and the graphitization were similar to those in Example 4-1. The properties of the graphite sheet are tabulated in Table 5.

TABLE 5

| | | Examples | | | |
|---|---|---|---|---|---|
| | | 4-1 | 4-2 | 4-3 | 4-4 |
| Polyimide film | Metal complex | Zirconium complex | Nickel complex | Titanium complex | Iron complex |
| | Thermal expansion coefficient (ppm/° C.) | 4.9 | 1.1 | 2.9 | −1.0 |
| | Thickness (μm) | | 25 | | |
| | Stiffness (mg) | 283.5 | 318.2 | 265.8 | 293.7 |
| Graphite sheet | Graphitization temperature (° C.) | | 2200 | | |
| | Graphitization degree (%) | 84.88 | 85.0 | 84.86 | 83.5 |
| | Electrical conductivity (S/cm) | 5437 | 5599 | 5531 | 6174 |
| | Thickness (μm) | | 11 | | |

Example 5-1

Figure 2:
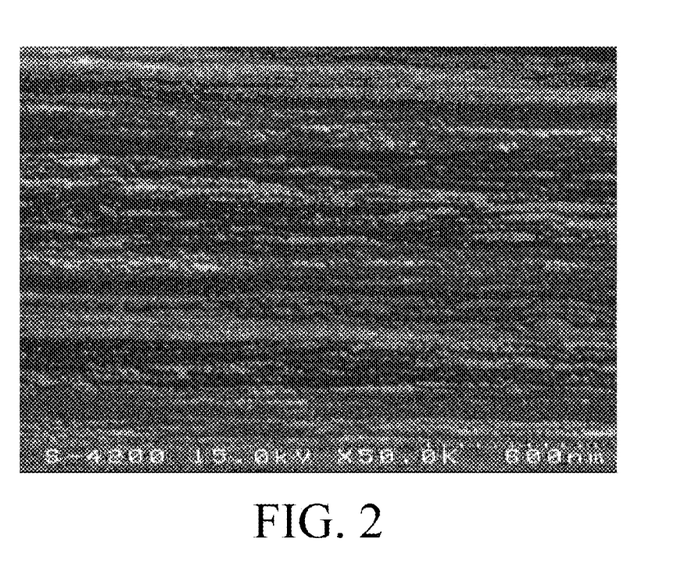
FIG. 2 shows an SEM cross section of a graphite sheet in one example of the disclosure.

Example 5-1 was similar to Example 2-1, with the difference in Example 3-1 being that the graphitization temperature was 1800° C. The properties of the graphite sheet are tabulated in Table 6, and the SEM (×50,000) of the graphite sheet is shown in FIG. 2. The cross section of the graphite sheet had layered microstructures. As shown by a comparison between FIGS. 1 and 2, the metal complex indeed catalyzed the graphitization.

Example 5-2

Example 5-2 was similar to Example 5-1, with the difference in Example 5-2 being that the zirconium complex was replaced to 0.005 mole (0.1 g) of a nickel complex (see Formula 22, wherein M was Ni, $R^1$ was $CH_3$, $R^2$ was $CF_3$, and n=4). The other processes for manufacturing the polyimide film and the graphitization were similar to those in Example 5-1. The properties of the graphite sheet are tabulated in Table 6.

Example 5-3

Example 5-3 was similar to Example 5-1, with the difference in Example 5-3 being that the zirconium complex was replaced to 0.005 mole (0.07 g) of a titanium complex (see Formula 22, wherein M was TiO, $R^1$ was $CH_3$, $R^2$ was $CH_3$, and n=2). The other processes for manufacturing the polyimide film and the graphitization were similar to those in Example 5-1. The properties of the graphite sheet are tabulated in Table 6.

Example 5-4

Example 5-4 was similar to Example 5-1, with the difference in Example 5-4 being that the zirconium complex was replaced to 0.005 mole (0.15 g) of an iron complex (see Formula 22, wherein M was Fe, $R^1$ was $CH_3$, $R^2$ was $CF_3$, and n=3). The other processes for manufacturing the polyimide film and the graphitization were similar to those in Example 5-1. The properties of the graphite sheet are tabulated in Table 6.

TABLE 6

| | | Examples | | | |
|---|---|---|---|---|---|
| | | 5-1 | 5-2 | 5-3 | 5-4 |
| Polyimide film | Metal complex | Zirconium complex | Nickel complex | Titanium complex | Iron complex |
| | Thermal expansion coefficient (ppm/° C.) | 4.9 | 1.1 | 2.9 | −1.0 |
| | Thickness (μm) | | 25 | | |
| | Stiffness (mg) | 285.7 | 316.5 | 263.5 | 287.3 |
| Graphite sheet | Graphitization temperature (° C.) | | 1800 | | |
| | Graphitization degree (%) | 17.67 | 16.51 | 22.56 | 17.6 |
| | Electrical conductivity (S/cm) | 1023 | 1018 | 1009 | 985 |
| | Thickness (μm) | | 16 | | |

As shown in Tables 3 and 6, the metal complex of Formula 22 obviously reduced the graphitization temperature. Especially when the graphitization temperature was lower than 2600° C., the electrical conductivities of the graphite sheets graphitized at 2400° C. in Table 4 were obviously higher than the electrical conductivities of the graphite sheets (without the metal complex) graphitized at 2400 in Tables 1 and 2.

Example 6-1

Example 6-1 was similar to Example 2-1, with the differences in Example 6-1 being that the polyimide film thickness was increased to 50 μm, the zirconium complex amount was 0.005 mole (0.2 g), and the graphitization temperature was 2400. The properties of the graphite sheet are tabulated in Table 7.

Example 6-2

Example 6-2 was similar to Example 6-1, with the difference in Example 6-2 being that the zirconium complex was replaced to 0.007 mole (0.15 g) of a nickel complex (see Formula 22, wherein M was Ni, le was $CH_3$, $R^2$ was $CF_3$, and n=4). The other processes for manufacturing the polyimide film and the graphitization were similar to those in Example 6-1. The properties of the graphite sheet are tabulated in Table 7.

Example 6-3

Example 6-3 was similar to Example 6-1, with the difference in Example 6-3 being that the zirconium complex was replaced to 0.01 mole (0.15 g) of a titanium complex (see Formula 22, wherein M was TiO, $R^1$ was $CH_3$, $R^2$ was $CH_3$, and n=2). The other processes for manufacturing the polyimide film and the graphitization were similar to those in Example 6-1. The properties of the graphite sheet are tabulated in Table 7.

Example 6-4

Example 6-4 was similar to Example 6-1, with the difference in Example 6-4 being that the zirconium complex was replaced to 0.005 mole (0.15 g) of an iron complex (see Formula 22, wherein M was Fe, $R^1$ was $CH_3$, $R^2$ was $CF_3$, and n=3). The other processes for manufacturing the polyimide film and the graphitization were similar to those in Example 6-1. The properties of the graphite sheet are tabulated in Table 7.

TABLE 7

|  |  | Examples | | | |
|---|---|---|---|---|---|
|  |  | 6-1 | 6-2 | 6-3 | 6-4 |
| Polyimide film | Metal complex | Zirconium complex | Nickel complex | Titanium complex | Iron complex |
|  | Thermal expansion coefficient (ppm/° C.) | 4.9 | 1.1 | 2.9 | −1.0 |
|  | Thickness (μm) |  | 50 | | |
| Graphite sheet | Stiffness (mg) | 2557 | 2860 | 2423 | 2631 |
|  | Graphitization temperature (° C.) |  | 2400 | | |
|  | Graphitization degree (%) | 91.9 | 90.5 | 91.2 | 90.3 |
|  | Electrical conductivity (S/cm) | 9436 | 9028 | 9215 | 9162 |
|  | Thickness (μm) |  | 19 | | |

Example 7-1

Example 7-1 was similar to Example 2-1, with the differences in Example 7-1 being that the polyimide film thickness was increased to 75 μm, the zirconium complex amount was 0.02 mole (0.78 g), and the graphitization temperature was 2400° C. The properties of the graphite sheet are tabulated in Table 8.

Example 7-2

Example 7-2 was similar to Example 7-1, with the difference in Example 7-2 being that the polyimide film thickness was increased to 125 μm, the zirconium complex amount was 0.026 mole (1.01 g). The properties of the graphite sheet are tabulated in Table 8.

TABLE 8

|  |  | Examples | |
|---|---|---|---|
|  |  | 7-1 | 7-2 |
| Polyimide film | Metal complex | Zirconium complex | Zirconium complex |
|  | Thermal expansion coefficient (ppm/° C.) | 1.1 | 1.1 |

TABLE 8-continued

|  |  | Examples | |
|---|---|---|---|
|  |  | 7-1 | 7-2 |
| Graphite sheet | Thickness (μm) | 75 | 125 |
|  | Stiffness (mg) | 5443 | 13258 |
|  | Graphitization temperature (° C.) | 2400 | |
|  | Graphitization degree (%) | 87.1 | 81.2 |
|  | Electrical conductivity (S/cm) | 7680 | 6130 |
|  | Thickness (μm) | 30 | 50 |

As shown in the above Examples and Comparative Examples, the metal complex in the polyimide film could reduce the graphitization temperature and enhance the electrical conductivity of the graphite sheet.

Example 8-1

Example 8-1 was similar to Example 1-1, with the differences in Example 8-1 being that the diamines were replaced to 0.6 mole (11.01 g) of the diamine of Formula 1, 0.3 mole (3.37 g) of the diamine of Formula 2, and 0.1 mole (1.06 g) of the diamine of Formula 10. The other processes for manufacturing the polyimide film and the graphitization were similar to those in Example 1-1. The properties of the graphite sheet are tabulated in Table 9.

Example 8-2

Example 8-2 was similar to Example 1-1, with the differences in Example 8-2 being that the diamines were replaced to 0.1 mole (2.09 g) of the diamine of Formula 1, 0.6 mole (7.69 g) of the diamine of Formula 2, and 0.3 mole (4.06 g) of the diamine of Formula 13. The other processes for manufacturing the polyimide film and the graphitization were similar to those in Example 1-1. The properties of the graphite sheet are tabulated in Table 9.

Example 8-3

Example 8-3 was similar to Example 1-1, with the differences in Example 8-3 being that the diamines were replaced to 0.1 mole (2.27 g) of the diamine of Formula 1, 0.6 mole (8.34 g) of the diamine of Formula 2, and 0.3 mole (2.12 g) of the diamine of Formula 21. The other processes for manufacturing the polyimide film and the graphitization were similar to those in Example 1-1. The properties of the graphite sheet are tabulated in Table 9.

Example 8-4

Example 8-4 was similar to Example 1-1, with the differences in Example 8-4 being that the diamines were replaced to 0.1 mole (2.39 g) of the diamine of Formula 1, 0.3 mole 4.4 g) of the diamine of Formula 2, 0.5 mole (3.74 g) of the diamine of Formula 21, and 0.1 mole (1.38 g) of the diamine of Formula 10. The other processes for manufacturing the polyimide film and the graphitization were similar to those in Example 1-1. The properties of the graphite sheet are tabulated in Table 9.

TABLE 9

| | | Examples | | | |
|---|---|---|---|---|---|
| | | 8-1 | 8-2 | 8-3 | 8-4 |
| Polyimide film | Thermal expansion coefficient (ppm/° C.) | 11.6 | 11.3 | 2.4 | 4.6 |
| | Thickness (μm) | | 25 | | |
| | Stiffness (mg) | 132.7 | 136.5 | 168.4 | 165.2 |
| Graphite sheet | Graphitization temperature (° C.) | | 2800 | | |
| | Graphitization degree (%) | 97.42 | 97.89 | 96.42 | 97.42 |
| | Electrical conductivity (S/cm) | 12650 | 11800 | 15064 | 14839 |
| | Thickness (μm) | | 10 | | |

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for manufacturing a graphite sheet, comprising:

performing a polymerization of diamines and a dianhydride to form a polyamic acid;

coating the polyamic acid on a substrate, and baking the coating to form a gel film;

biaxially stretching, thermally or chemically cyclizing and dehydrating the gel film to form a polyimide film; and carbonizing and graphitizing the polyimide film to form a graphite sheet, wherein the diamines include a diamine of Formula 1 and a diamine of Formula 2, and the dianhydride includes a dianhydride of Formula 3, Formula 4, Formula 5, Formula 6, Formula 7, Formula 8, Formula 9, or combinations thereof:

(Formula 1)

(Formula 2)

(Formula 3)

(Formula 4)

(Formula 5)

(Formula 6)

(Formula 7)

(Formula 8)

(Formula 9)

wherein the polyamic acid is formed by the polymerization of 1 part by mole of the dianhydride, a parts by mole of the diamine of Formula 1, and b parts by mole of the diamine of formula 2, wherein a+b=1, and 0.11≤a:b≤9.0.

2. A method for manufacturing a graphite sheet, comprising:

performing a polymerization of diamines and a dianhydride to form a polyamic acid;

coating the polyamic acid on a substrate, and baking the coating to form a gel film;

biaxially stretching, thermally or chemically cyclizing and dehydrating the gel film to form a polyimide film; and carbonizing and graphitizing the polyimide film to form a graphite sheet, wherein the diamines include a diamine of Formula 1 and a diamine of Formula 2, an additional diamine of Formula 10, Formula 11, Formula 12, Formula 13, Formula 14, Formula 15, Formula 16, Formula 17, Formula 18, Formula 19, Formula 20, Formula 21, or combinations thereof, and the dianhydride includes a dianhydride of Formula 3, Formula 4, Formula 5, Formula 6, Formula 7, Formula 8, Formula 9, or combinations thereof:

(Formula 1)

(Formula 2)

(Formula 3)

(Formula 4)

(Formula 5)

(Formula 6)

(Formula 7)

(Formula 8)

(Formula 9)

(Formula 10)

(Formula 11)

(Formula 12)

(Formula 13)

-continued (Formula 14)

(Formula 15)

(Formula 16)

(Formula 17)

(Formula 18)

(Formula 19)

(Formula 20)

(Formula 21)

wherein the polyamic acid is formed by the polymerization of:
1 part by mole of the dianhydride;
a parts by mole of the diamine of Formula 1;
b parts by mole of the diamine of Formula 2; and
c parts by mole of the additional diamine of Formula 10, Formula 11, Formula 12, Formula 13, Formula 14, Formula 15, Formula 16, Formula 17, Formula 18, Formula 19, Formula 20, Formula 21, or combinations thereof,
wherein a+b+c=1, and 0.11≤a:b≤9.0;
wherein 0.1:0.9≤(a+b):c<1:0.

3. The method as claimed in claim 1, wherein the step of graphitizing the polyimide film to form the graphite sheet is performed at a temperature of 2400° C. to 2800° C.

4. The method as claimed in claim 1, further comprising adding a metal complex to the polymerization, and the dianhydride and the metal complex have a molar ratio of 1:0.001 to 1:0.2, wherein the metal complex includes a metal complex of Formula 22:

(Formula 22)

wherein each of $R^1$ and $R^2$, being the same or different, is $CH_3$ or $CF_3$;
n is an integer of 2 to 4; and
M is Zr, Ni, TiO, Fe, Co, Mn, Mg, Cu, Al, Cr, Ba, Pr, Pd, Sc, Na, Zn, V, Y, Pt, or Tl.

5. The method as claimed in claim 4, wherein M is Zr, $R^1$ is $CH_3$, $R^2$ is $CF_3$, and n=4.

6. The method as claimed in claim 4, wherein M is Ni, $R^1$ is $CH_3$, $R^2$ is $CF_3$, and n=4.

7. The method as claimed in claim 4, wherein M is TiO, $R^1$ is $CH_3$, $R^2$ is $CH_3$, and n=2.

8. The method as claimed in claim 4, wherein M is Fe, $R^1$ is $CH_3$, $R^2$ is $CF_3$, and n=3.

9. The method as claimed in claim 4, wherein the step of graphitizing the polyimide film to form the graphite sheet is performed at a temperature of 1800° C. to 2800° C.

10. The method as claimed in claim 2, wherein the step of graphitizing the polyimide film to form the graphite sheet is performed at a temperature of 2400° C. to 2800° C.

11. The method as claimed in claim 2, further comprising adding a metal complex to the polymerization, and the dianhydride and the metal complex have a molar ratio of 1:0.001 to 1:0.2, wherein the metal complex includes a metal complex of Formula 22:

(Formula 22)

wherein each of $R^1$ and $R^2$, being the same or different, is $CH_3$ or $CF_3$;
n is an integer of 2 to 4; and
M is Zr, Ni, TiO, Fe, Co, Mn, Mg, Cu, Al, Cr, Ba, Pr, Pd, Sc, Na, Zn, V, Y, Pt, or Tl.

12. The method as claimed in claim 11, wherein M is Zr, $R^1$ is $CH_3$, $R^2$ is $CF_3$, and n=4.

13. The method as claimed in claim 11, wherein M is Ni, $R^1$ is $CH_3$, $R^2$ is $CF_3$, and n=4.

14. The method as claimed in claim 11, wherein M is TiO, $R^1$ is $CH_3$, $R^2$ is $CH_3$, and n=2.

15. The method as claimed in claim 11, wherein M is Fe, $R^1$ is $CH_3$, $R^2$ is $CF_3$, and n=3.

16. The method as claimed in claim 11, wherein the step of graphitizing the polyimide film to form the graphite sheet is performed at a temperature of 1800° C. to 2800° C.

* * * * *